United States Patent [19]

Davis

[11] 4,303,258
[45] Dec. 1, 1981

[54] ANIMAL CARRIER AND PASSAGEWAY

[76] Inventor: Woodrow G. Davis, Rte. 1, Marlow, Okla. 73501

[21] Appl. No.: 82,106

[22] Filed: Oct. 5, 1979

[51] Int. Cl.³ .......................... B60D 5/00; B60P 3/04
[52] U.S. Cl. ..................................... 280/403; 119/14; 119/82; 296/12
[58] Field of Search .................. 280/400, 403; 296/12, 296/13, 14, 50, 51, 61; 119/82, 14; 414/340

[56] References Cited

U.S. PATENT DOCUMENTS

| | | | |
|---|---|---|---|
| 447,919 | 3/1891 | Sylvester | 119/14 |
| 772,565 | 10/1904 | Gilleland | 119/14 |
| 791,530 | 6/1905 | Almond | 119/14 |
| 889,176 | 5/1908 | Buckner | 119/14 |
| 2,215,631 | 9/1940 | Young | 296/61 |
| 2,924,347 | 2/1960 | Scott | 280/400 X |
| 3,600,032 | 8/1971 | Gross | 296/50 |
| 3,841,663 | 10/1974 | Proffit | 280/475 |

FOREIGN PATENT DOCUMENTS 318395 9/1929 United Kingdom .............. 296/24 C

*Primary Examiner*—John A. Pekar
*Attorney, Agent, or Firm*—Christopher H. Morgan

[57] ABSTRACT

An improved animal carrier and passageway wherein a pickup truck has an animal enclosure with walls extending upwardly from the truck bed walls and a rear wall which extends upwardly from the truck bed inside the rear gate. The rear wall has an opening which can be selectively closed with a gate. A trailer can be attached to the pickup by a hitch at the front of the trailer. The trailer has an animal housing with an opening at its front end. A walking board extends from the front opening of the trailer to the rear wall opening of the truck enclosure to allow animals to walk between the trailer housing and the truck enclosure. Side rails extend along the walking board to contain the animals walking thereon.

7 Claims, 5 Drawing Figures

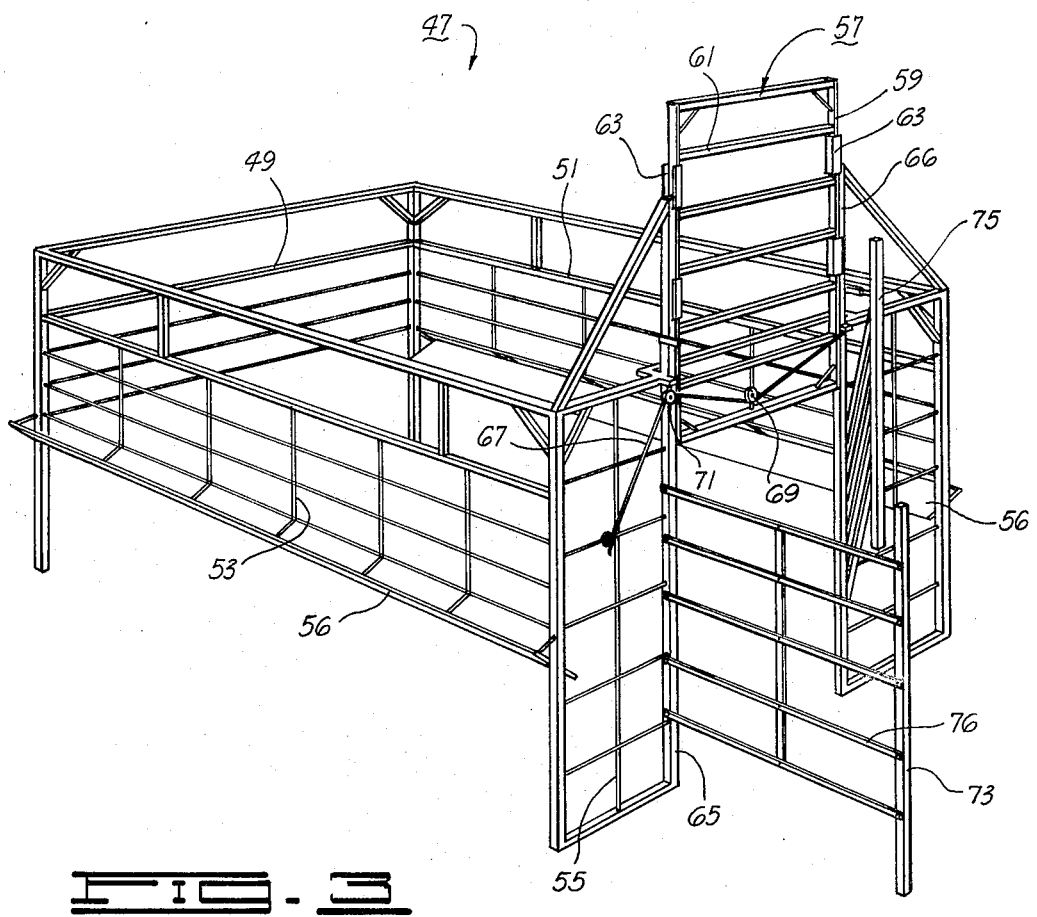
FIG. 3
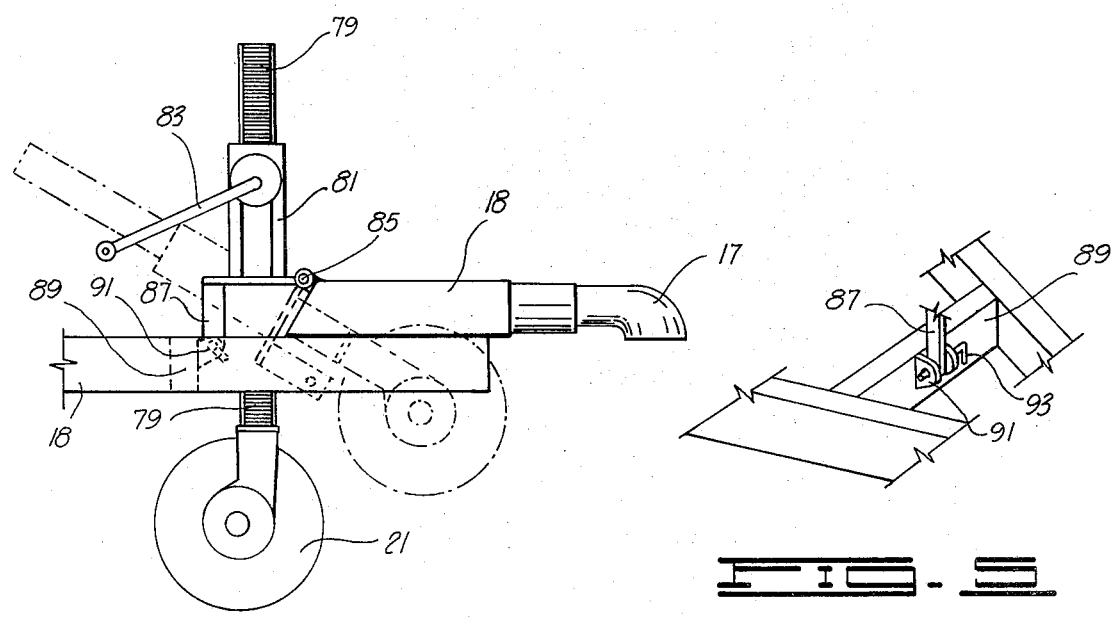
FIG. 4
FIG. 5

ANIMAL CARRIER AND PASSAGEWAY

BACKGROUND OF THE INVENTION

1. Field of the Invention

This invention relates in general to housings and passageways for animals and more particularly, to housings and passageways for animals to be used in connection with vehicles.

2. Description of the Prior Art

In the past, a wide variety of trucks and trailers have been used for carrying animals. Perhaps most commonly used is the livestock trailer which is attached to a towing vehicle. These livestock trailers have one or more beds for supporting the animals inside the trailer and a housing which surrounds the bed to contain the animals. A rear opening in the trailer allows the animals to be transferred to and from the trailer housing. Usually a ramp adapted for extension from the rear opening at the level of the bed to ground level is used when loading the animals.

A wide variety of towing vehicles are used for towing the animal or livestock trailers described. These towing vehicles range from semitrailer trucks to pickup trucks and even smaller vehicles. When smaller trailers and towing vehicles are used, a hitch is usually provided between the towing vehicle and the trailer to allow a flexible and detachable connection therebetween.

In addition to the trailer type of animal housing, animal housings have also been joined as integral parts of vehicles. U.S. Pat. No. 3,600,032 to Gross shows an animal housing attached as part of a pickup truck. The truck of Gross has an enclosure formed by walls attached to the upper part of the walls around the bed of the pickup and a pair of hinged rear doors inside the rear gate of the pickup. The doors allow animals to be loaded into the housing. U.S. Pat. No. 2,808,291 to van Meter shows a similar animal housing which detachably fits in the bed of a pickup truck and has a ramp pivotally attached to the rear of the housing for loading animals to and from the housing.

While the animal carrying vehicles and trailers as described above have been useful, they have not been entirely satisfactory.

SUMMARY OF THE INVENTION

It is accordingly an object of the present invention to provide an improved animal enclosure and passageway for a pickup truck.

It is also an object of the present invention to provide an improved animal trailer which allows animals to be loaded and unloaded from the front of the trailer.

Yet another object of the present invention is to provide an improved combination of a pickup truck and an animal trailer hitched to the pickup truck for towing, the improvement allowing animals to pass between an animal enclosure in the bed of the pickup and the trailer while the pickup is hitched to the trailer.

In accordance with the present invention an animal enclosure is formed in the walled bed of a pickup truck by wall extensions which extend upwardly from the upper portions of the truck bed walls and a rear wall which extends upwardly from the bed of the pickup truck inside the rear gate. The rear wall has an opening for allowing the passage of animals therethrough and a gate for selectively closing the rear wall opening. A trailer having an animal housing and a hitch at its front end can be attached by this hitch to the rear of the pickup truck. The trailer has an opening in the front of its animal housing.

A walking board adapted for extension from the front opening of the trailer to the rear wall opening of the enclosure of the truck allows animals to walk between the trailer housing and the truck enclosure. Means adapted for extension along the walking boards are provided for containing the animals as they walk on the walking board between the trailer and the truck.

For a further understanding of the invention and further objects, features and advantages thereof, reference may now be had to the following description taking in conjunction with the accompanying drawings.

BRIEF DESCRIPTION OF THE DRAWINGS

FIG. 3 is a perspective view of the enclosure of FIG. 1 shown removed from the truck bed.

FIG. 4 is a rear side view of the front end of the trailer of FIG. 1.

FIG. 5 is a perspective cut-away view of a portion of the trailer frame.

DESCRIPTION OF THE PREFERRED EMBODIMENTS

Figure 1:
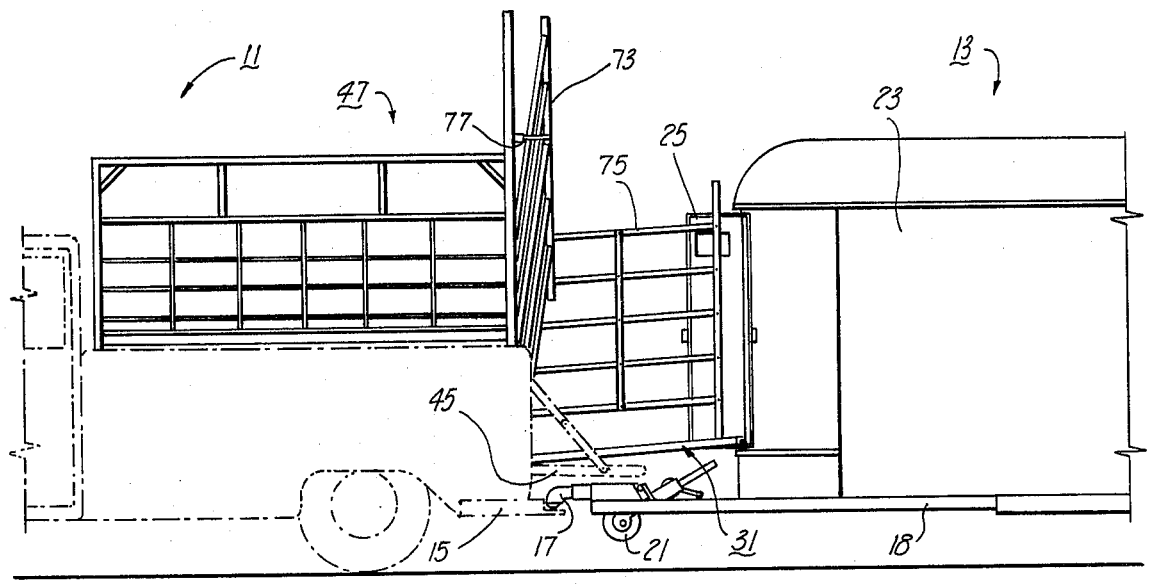
FIG. 1 is a side plan view of the truck and trailer of the present invention.

Referring now to FIG. 1, a pickup truck 11 is attached to a livestock trailer 13 in a conventional manner. A trailer hitch ball 15 extending from the rear of pickup truck 11 is lockingly received in a hitch socket 17 of a trailer 13. Hitch socket 17 extends from the front portion of the frame 18 of the trailer 13. This connection provides a ball and socket type pivot movement between truck 11 and trailer 13 to allow trailer 13 to be towed by the truck over normal bumps and turns.

Trailer 13 is supported by two wheels 19 and 20, extending on either side of frame 18 somewhat behind the center of the trailer. These wheels 19 and 20 support the trailer when the trailer is being towed. When not in motion, the trailer 13 can be supported by a third wheel 21 mounted on frame 18 at the front of the trailer. The height of this third wheel 21 can be adjusted to level the trailer by a height adjustment assembly. Wheel 21 and its height adjustment assembly will be described in more detail subsequently. The upper part of trailer 13 consists of an animal or livestock housing 23. Housing 23 has four walls and a roof which protect enclosed animals when they are located in the housing 23. These walls and roof may or may not be perforated depending on whether the animals are to be protected against wind and rain when they are contained in the enclosure. As in conventional trailers, housing 13 has rear door opening (not shown) in its rear wall to allow the animals to be loaded into the trailer from the rear. A ramp can be provided to facilitate this rear loading. The floor of housing 23 supports the walls and roof above the frame 18. The floor of housing 23 also supports the animals when they are contained in the housing.

Figure 2:
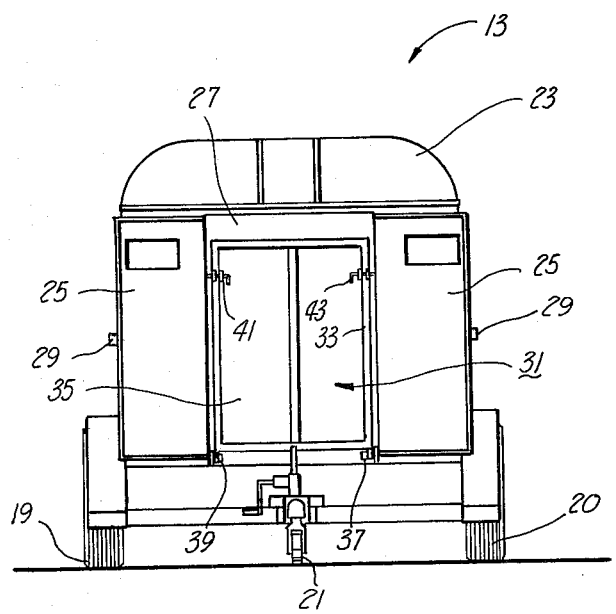
FIG. 2 is a front end view of the trailer of FIG. 1.

A pair of doors 25 opens to forms a front opening 27 in the front, central portion of housing 23. Doors 25 extend from the roof of housing 23 to the floor of housing 23. This creates an opening which allows the movement of animals through opening 27. Doors 25 are vertically attached to housing 23 by hinges such that they meet at the vertical central axis of opening 27 when closed and swing horizontally outwardly to open. In FIGS. 1 and 2, the doors 25 are shown in an open position. A fastener 29 attached to the outside of doors 25, allows the two doors to be fastened together to hold them in a closed position when desired.

A walking board 31 is pivotally attached to housing 23 at the lower end of opening 29. Walking board 31 has a rectangular frame 33 at its periphery which is attached to and supports a relatively smooth surface member 35. The surface member 35 can be made of plywood or other material which is safe as a walking surface for animals. Frame 33 can be made of metal bars. Extending through frame 33 and attached to housing 23 are bolts 37 and 39. These bolts attach walking board 31 for pivotal movement about the lower end of opening 27. Thus, when walking board 31 is raised it extends upwardly into opening 27 and when it is lowered, it extends outwardly from opening 27 to form a walking surface which is substantially continuous with the floor of housing 23. In its lowered position, walking board 31 extends over the hitch 17 which allows animals to walk to or from the front opening 27 over the hitch 17. In order to hold walking board 31 in its raised position, sliding bolts 41 and 43 are located on opposing sides of walking board 31 at the end opposite its pivotal attachment. Sliding bolts 41 and 43 are attached to frame 33 and slidably extend into holes in housing 23 at the upper side portions of opening 27. When bolts 41 and 43 are slidably removed from their holes in housing 23, walking board 31 is free to pivot about bolts 37 and 39. When bolts 41 and 43 are extended into their holes in housing 23, walking board 31 is held rigidly in its raised position in opening 27. The raised or stowed position of walking board 31 is used when the trailer is being towed while the lowered position is used during the movement of animals through the front opening 27. FIG. 2 shows the walking board 31 in its stowed position and FIG. 1 shows walking board 31 in its lowered position.

As shown in FIG. 1, walking board 31 is in its lowered position and trailer 13 is attached to pickup truck 11. The rear gate 45 of pickup truck 11 is also lowered and extends below walking board 31. With rear gate 45 and walking board 31 lowered, a walking surface is created between the floor of trailer 13 and the bed of pickup truck 11.

Referring now to FIG. 3 as well as FIG. 1, an animal enclosure 47 fits in the bed of pickup truck 11. Enclosure 47 is rectangular in shape, having a front wall 49, side walls 51 and 43, and a rear wall 55. These walls are formed by a plurality of horizontal and vertical crossing bars welded to frame members which extend from the floor of the truck bed to the height desired to contain the animals therein. Since the walls of the truck bed form an enclosure of limited height, the crossing metal bars need not extend to the floor of the truck bed but rather must extend upwardly only from upper portion of the truck bed walls to the height necessary to contain the animals in the enclosure. If desired, a kick plate 56 can be attached to enclosure 47 just above the walls of the truck bed to prevent animals in the enclosure from injuring their legs. This kick plate 56 can extend obliquely above the walls of the truck bed to deflect the animals' hooves and prevent a leg from being caught between the bars and the bed walls. Unlike the side and front walls, the crossing bars on the rear walls of enclosure 47 extend from the truck bed to the height of the enclosure since rear gate 45 of the pickup truck is often open while animals are in the enclosure. Rear wall 55 extends upwardly from the bed of the truck just inside the rear gate 45.

A drop gate 57 at the center of rear wall 55 allows a selective opening into enclosure 47. Drop gate 57 has a rectangularly shaped frame 59 with horizontal cross bars 61 extending across the frame 59. On each side of frame 59 are upper and lower channel-shaped guides 63. These channel-shaped guides 63 face outwardly and are received about a left door frame member 65 and a right door frame member 66 to guide the drop gate as it slides up and down. The door frame members 65 and 66 extend upwardly beyond the height of the pen so that the gate can be raised to the height of the pen.

Because drop gate 57 is urged downwardly by gravity into its closed position, a mechanism for holding the gate open is needed for loading animals into enclosure 47. This mechanism is provided by a rope 67 and pulleys 69 and 71. Pulley 69 is attached to the lower central portion of gate 47 while pulley 71 is attached to the upper portion of left door frame member 65. One end of rope 67 is attached to the upper end of right door frame member 66 at the height of pulley 71. Rope 67 is then received under pulley 69 and over pulley 71. This configuration causes the length of rope between pulley 71 and the attachment to door frame member 66 to increase as the door is lowered. Therefore, by pulling on the free end of the rope, the length of rope between these points is shortened and drop gate 57 is raised. To hold gate 57 in its opened position, the free end of rope 57 is tied to a convenient bar of enclosure 47 after the rope has pulled the gate to its open position.

Attached to door frame member 65 are two contractable side rails 73 and 75. Left side rail 73 is attached to the left side of left door frame member 65 and right side rail 75 is attached to the right side of right door frame member 66. Each of the side rails has a plurality of pivot bars such as bar 76. These pivot bars are pivotally attached to respective door frame members so that each bar is free to vertically pivot about its connection to the door frame. These bars are also pivotally attached to a central vertical bar and an end vertical bar. These pivotal attachments allow the side rails to be raised or lowered by raising the end bars and collapsing the pivot bars as they pivot upwardly. In FIG. 3, left side rail 73 is shown in its lowered or horizontal position and right side rail 75 is shown in its raised or vertical position. In FIG. 1, right side rail 75 is shown in its lowered position and left side rail 73 is shown in its raised position. When walking board 31 is lowered and side rails 73 and 75 are lowered, the end bars of the side rails rest on the walking board near opening 27. In this position, the side rails extend along walking board 31 for containing animals as they walk on the walking board between the trailer housing and the truck.

Each of the door frame members has a fastener which can be attached to their respective side rails when the side rails are in their raised positions. In this manner, the side rails can be held in their raised or stowed position. Fastener 77 is shown in FIG. 1 holding the left side rail 73 in its stowed position. When side rails 73 and 75 are in their stowed position, the rear gate 45 of the pickup truck can be closed.

The walls of enclosure 47 are connected so that enclosure 47 forms a single structure which removably fits in the bed of the pickup truck. This allows the truck to be quickly converted for use with the enclosure or without the enclosure. It also allows the enclosure to be used on other trucks as well.

If desired, a floor can be added to the lower end of enclosure 47 to cover the metal bed of the pickup truck. A wooden floor is safer for the animals than the metal bed. This floor can be attached to the enclosure to form a part of the single structure described above.

Referring to FIGS. 4 and 5, the front end of trailer 13 and its frame 18 is shown in more detail. As can be seen, wheel 21 is rotatably attached to a rack bar 79 which extends through a gear box 81. The gears within gear box 81 are operated manually by crank 83. These gears mesh with rack bar 79 to selectively raise or lower wheel 21 with respect to frame 18. This allows the height of the front end of the trailer 13 to be adjusted for leveling or the like by the operation of crank 83. These components of the height adjustment assembly are old in the art. However, the attachment of gear box 81 to frame 18 is not old. Because the lowering of walking board 31 can be obstructed by the lower end of rack 79 and gear box 81, a means for selectively removing these elements from the path of walking board 31 is needed. For this reason, a hinge 85 connects the front end of gear box 81 to frame 18 so that wheel 21 and its height adjusting assembly can pivot about the hinge. Using the hinge connection 85, rack 79 and gear box 81 can be swung rearwardly and out of the way when walking board 31 is moved into its lowered position. FIG. 1 shows walking board 31 in its lowered position and the gear box and rack member swung out of the way. FIG. 4 shows the gear box in its upright position and then, in dotted line, in its rearward, oblique position.

When wheel 21 is supporting the front end of trailer 13 it must be rigidly held in place. Therefore, when wheel 21 is used for support, the gear box and rack member must not pivot about hinge 85. A flange 87 extending from the rear of gear box 81 connects to a cross bar 89 of frame 18 to achieve this rigid positioning. As can be seen in the perspective cut-away view of FIG. 5, cross member 89 extends across the front V-joint of frame 18, forming a triangularly shaped section at the front of frame 18. Rack member 79 extends through this triangularly shaped section. When the height adjusting assembly is in its upright or locked position, flange 87 fits between a pair of receiving flanges 91 which extend outwardly from cross member 89. A pair of holes in flanges 91 is aligned with a hole in flange 87. This allows a sliding bolt 93 to be inserted through the holes to rigidly retain flange 87 in relation to flanges 91. This rigid connection prevents the gear box 81 and rack member 79 from pivoting about hinge 85. When gear box 81 and rack member 79 are to be swung out of the way, sliding bolt 93 is removed from its holes and the assembly can be pivoted about hinge 85.

From the above description it can be seen that the present invention allows trailer 13 and pickup 11 to be used in a variety of new ways. Enclosure 47 allows animals to be loaded and retained in the bed area of the pickup truck 11. The front opening 27 and walking board 31 allow animals in trailer 13 to be loaded and unloaded from the front of the trailer 13 and over the hitch socket 17. When pickup 11 and trailer 13 are connected, animals can be moved from housing 23 to enclosure 47 and vice versa.

When trailer 13 is being towed by truck 11, walking board 31 and side rails 73 and 75 should be secured in their stowed positions. Also, doors 25 and rear gate 45 should be fastened closed. Wheel 21 and the height adjusting assembly can be locked in their upright position. Drop gate 57 should be lowered. In this configuration the equipment is secured to prevent jostling during traveling and trailer 13 is free to pivot behind truck 11 during bumps and turns. Enclosure 47 and housing 23 are closed to contain the animals therein.

When animals are to be transferred between enclosure 47 and housing 23, sliding bolt 93 is removed and gear housing 81 and rack bar 79 are pivoted out of the way to permit lowering of walking board 31. Rear gate 45 is lowered and doors 25 are unfastened and opened. Sliding bolts 41 and 43 are removed from their holes in housing 23 and walking board 31 is lowered to extend from opening 27 to gate 57. Walking board 31 forms a substantially continuous walking surface from the floor of housing 23 to the floor of enclosure 47. Next side rails 73 and 75 are unfastened and lowered to extend along walking board 31. Gate 57 is then selectively opened and closed as animals pass into and out of enclosure 47 along walking board 57.

When truck 11 and trailer 13 are separated, wheel 21 and its height adjustment assembly can be locked in their upright position and used for leveling of trailer 13 or the like. Enclosure 47, gate 57 and side rails 73 and 75 can be used separately or with a separate walking board for enclosing and transferring animals to and from enclosure 47 over rear gate 31. The front opening 27 and walking board 31 can be used separately for transferring animals to or from housing 23 over hitch socket 17.

Thus, the present invention is well adapted to attain the objects and advantages mentioned as well as those inherent therein. While presently preferred embodiments of the invention have been described for the purpose of this disclosure, numerous changes in the construction and arrangement of the parts can be made by those skilled in the art which changes are encompassed in the spirit of this invention as defined by the appended claims.

The foregoing disclosure and the showings made in the drawings are merely illustrative of the principles of this invention and are not to be interpreted in a limiting sense.

What is claimed is:

1. An animal enclosure and passageway for joining a livestock trailer having a front opening with the bed of a pickup truck, the enclosure and passageway comprising:

an animal enclosure for converting the bed of a pickup truck to an area for holding animals, said enclosure having a rear opening;

a walking board adapted for extension from the front opening of the trailer to said rear opening of said animal enclosure for supporting animals as they walk between the trailer and the truck;

two side rails attached to a selected one of said animal enclosure and livestock trailer and movable between a position along said walking board for containing the animals as they walk on said walking board between the trailer and the truck and a stowed position; and gate means disposed for regulating the movement of animals through said rear opening of said animal enclosure and the passageway formed by said walking board and said side rails.

2. The passageway of claim 1 wherein said walking board is pivotally attached to the trailer such that said walking board can be pivotally raised to a stowed position in the front opening of the trailer when not being used for supporting animals as they walk between the trailer and the truck.

3. The passageway of claim 1, wherein said gate means comprises a sliding drop gate disposed across said rear opening of said animal enclosure.

4. An improved combination of a pickup truck and an animal trailer hitched to said pickup truck for towing, the improvement comprising:

the trailer having a front opening to allow animal passage therethrough;

the pickup truck having an animal enclosure with an opening at the rear of the pickup truck;

a walking board adapted for extension from said front opening of the trailer to said rear opening of said animal enclosure;

two side rails attached to said animal enclosure and movable from a position along said walking board for containing the animals as they walk on said walking board between the trailer and the truck and a stowed position; and gate means connected across the opening of said animal enclosure at the rear of the pickup truck for selectively opening and closing the passageway formed by the rail means and said walking board such that the movement of animals along the passageway can be regulated.

5. The improvement of claim 4 which further comprises an improved height adjusting assembly of the type attached to the front of the trailer for leveling the trailer or the like, the improvement comprising:

means for moving the leveling assembly such that it does not obstruct the positioning of the walking board in its extended position over the hitch to allow animals to walk from the animal housing over the hitch.

6. An animal enclosure and passageway for a pickup truck having a walled bed and a rear gate, comprising:

wall extensions which extend upwardly from the upper portions of the truck bed walls to contain animals in the bed area of the pickup truck;

a rear wall extending upwardly from the bed of the pickup truck inside the rear gate;

said rear wall having an opening to allow the passage of animals therethrough;

a walking board adapted for extension over the rear gate of the pickup truck to said opening for supporting animals as they walk over the rear gate to said opening;

two extensible side rails connected to said rear wall and movable between a position along said walking board for containing the animals as they walk on said walking board over the rear gate to said opening and a stowed position which allows the rear gate of the pickup truck to be closed; and a rear wall gate disposed for selectively opening and closing said opening said said rear wall, said gate being movable from a raised, open position to a lowered, closed position to regulate movement of animals into and out of the walled bed of the pickup truck along said walking board.

7. The animal enclosure and passageway of claim 6 wherein said wall extensions and said rear wall are connected to form a single structure which removably fits in the bed area of the pickup truck.

* * * * *